Aug. 6, 1974 G. D. KNORR Re. 28,101

AIR CUSHION VEHICLE

Original Filed Aug. 31, 1970

United States Patent Office

Re. 28,101
Reissued Aug. 6, 1974

28,101
AIR CUSHION VEHICLE

Gordon Dayton Knorr, Westlake Village, Calif., assignor to Global Marine Inc., Los Angeles, Calif.

Original No. 3,688,850, dated Sept. 5, 1972, Ser. No. 68,162, Aug. 31, 1970. Application for reissue Dec. 29, 1972, Ser. No. 319,515
Int. Cl. E21b *33/035*
U.S. Cl. 175—5 15 Claims

Matter enclosed in heavy brackets [ ] appears in the original patent but forms no part of this reissue specification; matter printed in italics indicates the additions made by reissue.

ABSTRACT OF THE DISCLOSURE

An air cushion vehicle in the form of a body having a flexible skirt therearound and means for pressurizing the region within the skirt is employed for transporting a well drilling rig or the like. A vertically extending slot is provided in the flexible skirt, comprising first and second flexible sheets on opposite sides of the slot in face to face abutment for sealing together. One side of each of the sheets is in fluid communication with the inside of the skirt and the two sheets are free to move relative to each other over a principal portion of their extent for passing an object therebetween. An oil well Christmas tree or the like having a streamlined sheath can be passed through the slot in order to move the air cushion vehicle off of or onto a wellhead.

BACKGROUND

In recent years there has been considerable interest in exploration for oil and gas reserves in Arctic regions, particularly in Alaska and northern Canada. In the course of exploiting these established oil and gas reserves, wells must be drilled under quite adverse conditions associated with the low temperatures of the Arctic environment. In order to move from one potential drilling site to another a drill rig may be transported across open water, permanent layers of ice, snow, muskeg, or tundra. Year around transportation over such surfaces is extremely difficult, particularly when the items being transported are heavy and bulky as is the equipment required for drilling oil wells.

In order to minimize the cost of Arctic operations it is desirable to move a completely assembled drilling unit from one drilling site to another drilling site. One of the principal problems in moving a completely assembled drilling unit in the Arctic involves the "foot-[prin"] *print*" pressure on the vehicle moving the unit. Because of the very high footprint pressures of an assembled drilling rig it is often completely impractical to move such a rig on wheels, tracks, or skis. Air cushion vehicles have been proposed for use in the Arctic environment for moving an entire assembled drill rig and many of the problems associated with such an air cushion vehicle have been explored in detail and resolved.

One of the problems facing an air cushion vehicle is moving in the immediate proximity of a wellhead, either when moving off of a completed wellhead or when moving on to an existing wellhead for work over. A completed wellhead includes many items of conventional equipment extending a substantial distance above ground level. Because the air cushion vehicle has a flexible skirt around its entire periphery, it is difficult to clear objects on the ground. An object as high as a wellhead with its completion equipment is much too high for a conventional air cushion vehicle to clear. One proposed solution has been to recess the wellhead in a basement or pit. However, the difficulties attendant in such an arrangement in the frozen Arctic are apparent.

Therefore it is desirable to provide a means for moving an air cushion vehicle off of a wellhead or other protruding object.

BRIEF SUMMARY OF THE INVENTION

Therefore in practice of this invention according to a presently preferred embodiment there is provided an air cushion vehicle having a body, a surrounding flexible skirt, and means for pressurizing the region beneath the skirt. A cavity is provided in the vehicle body adjacent a vertically extending slot in the skirt, wherein the slot comprises first and second vertically extending flexible sheets in face to face abutment for sealing together and free to move relative to each other over *a* principal portion of their vertical extent for passing an object therebetween. In a preferred arrangement such a slot is provided in an air cushion vehicle for transporting a well drilling rig.

DRAWINGS

These and other features and advantages of the present invention will be appreciated as the same becomes better understood by reference to the following detailed description of a presently preferred embodiment when considered in connection with the accompanying drawings wherein.

Throughout the drawings like numerals refer to like parts.

DESCRIPTION

Figure 1:
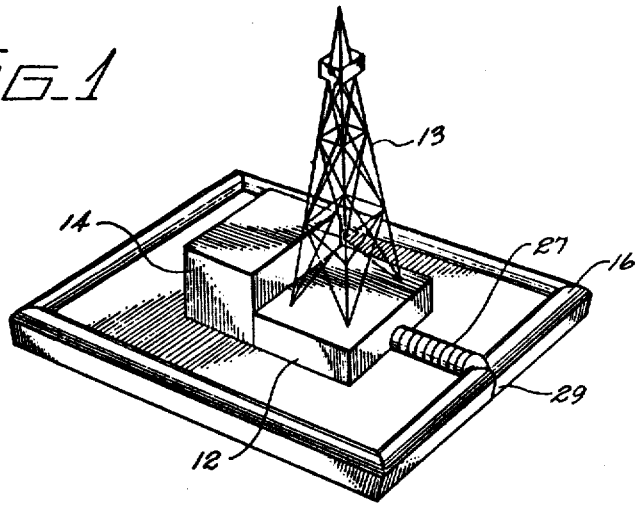
FIG. 1 illustrates in perspective an air cushion vehicle constructed according to principles of this invention.

FIG. 1 illustrates in perspective a drill rig mounted on an air cushion vehicle constructed according to principles of this invention. As illustrated in this embodiment the air cushion vehicle comprises a rectangular body or chassis 11 forming the principal structural elements of the vehicle. Roughly centrally located on the body 11 is a protective shelter 12 located over the moon pool (not shown) through the vehicle body that permits drilling tools to be raised and lowered in a well. A tower 13 of conventional nature for handling the drilling tools and lengths of drill string is provided above the shelter 12. Another building 14 may be provided for accommodating the draw works and other equipment associated with drilling and completion of an oil well. The drilling equipment provided on the chassis 11 is substantially conventional and not hereinafter set out in greater detail.

Figure 2:
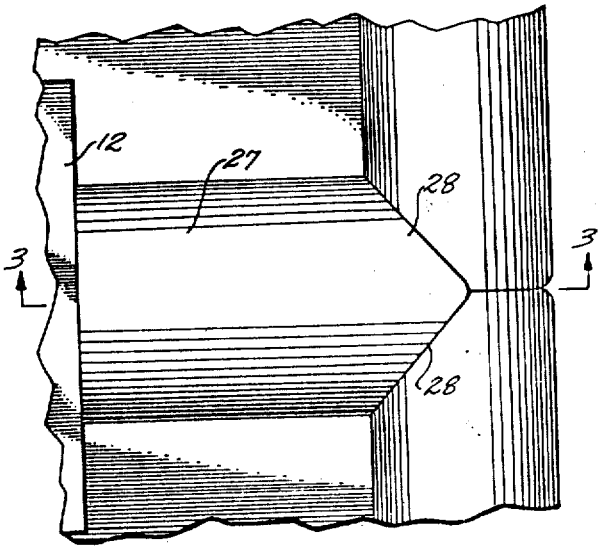
FIG. 2 illustrates in top view a portion of the skirt region of the air cushion vehicle.

Surrounding the chassis 11 is a flexible skirt 16 which may, for example, be formed of plastic coated fabric having flexibility in the extreme temperature regimes encountered in the Arctic. As may be more clearly seen in FIGS. 2, 3, and 4, the upper portion of the flexible skirt is in the form of a substantially continuous open plenum 17 extending around the periphery of the vehicle. If desired the opening plenum can be segmented into a plurality of sections each extending around a portion of the vehicle, however this has not been found to be necessary. During operation pressurizing air is injected into the peripheral plenum 17 and thereby increases the pressure above ambient so that the flexible skirt 16 billows upwardly and outwardly from the body of the vehicle. Air injected into the peripheral plenum flows around the vehicle so as to substantially equalize the pressure therein.

The lower portion of the skirt is segmented intermittently in a direction running around the periphery of the vehicle. Each of the separate segments 18 is separated from its adjacent segment by a sheet of flexible material 19. The bottom of each of the segments 18 is open so that air can flow from the plenum downwardly through the segments and escape through the open bottom adjacent the ground 21.

Since air escapes from beneath the skirt 16 into the region beneath the body 11 (and also into the external environment) the pressure beneath the body increases to almost the same pressure as found within the skirt. This increased pressure beneath the body of the vehicle provides a substantial lifting force over the entire under surface of the body thereby lifting it and uniformly distributing its weight over the entire region within the outermost edge of the skirt. This uniform weight distribution maintains a low footprint pressure for the air cushion vehicle and permits it to be transported over varying ground conditions, either as a towed vehicle or under its own propulsion.

The flexible skirt 16 will rise as it passes over objects on the ground and in a unit of the size involved in transporting a well drilling rig, obstructions a foot or more in height can be cleared due to the flexibility of the skirt and the very large volume of air injected thereunder. Such a skirt is not capable of clearing a completed wellhead or the like.

In drilling and completing an oil well, gas well, or the like it is conventional practice to provide a "Christmas tree" on the wellhead for safety purposes and also for controlling production of the well. During some operations a blow-out preventer is maintained on the wellhead for controlling pressure surges. In other situations the Christmas tree includes a variety of control valves for controlling oil field production.

Figure 4:
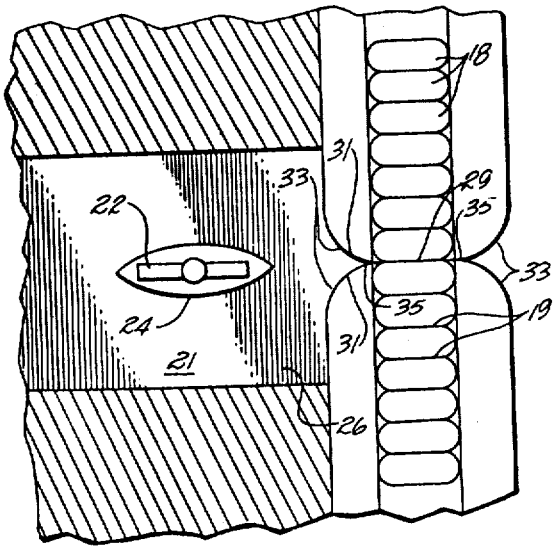
FIG. 4 is a horizontal cross section, substantially directly below the plan view of FIG. 2.
Figure 3:
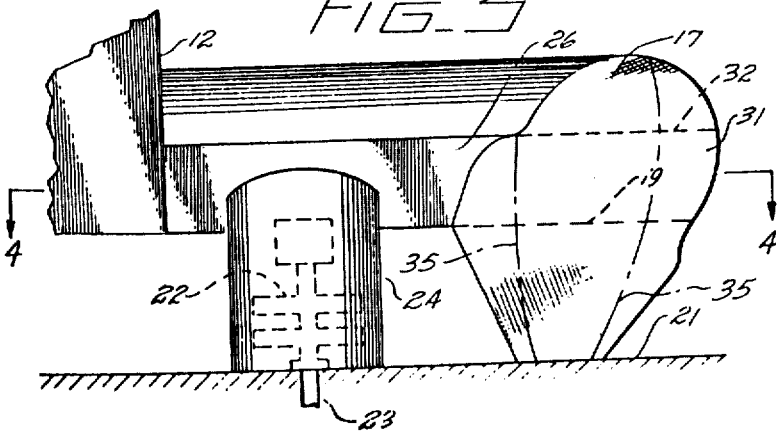
FIG. 3 is a vertical cross section through a slot in the skirt illustrated in FIG. 2.

Thus as illustrated in FIG. 3 a conventional Christmas tree 22 is mounted over a well hole 23 in a completely conventional manner. The Christmas tree comprises a number of valves, pipes and other irregular projections (not shown in detail) that would catch on the skirt of an air cushioned vehicle. In order to prevent such catching, a sheet metal sheath 24 having an elongated, streamlined horizontal cross section is fitted over the Christmas tree. The exterior of the sheath 24 is smooth and streamlined so as not to catch on any portion of the skirt. It will be noted, however, that the sheath 24 as seen in FIG. 3, which shows the vehicle in its traveling position about half way off of the wellhead, is quite tall and would interfere with proper operation of the air cushion vehicle skirt. FIGS. 3 and 4 illustrate the vehicle in a temporary position between the position from which drilling or similar operations are conducted and a position completely removed from the wellhead.

Means are therefore provided for passing the skirt over the streamlined metal sheath, or relatively speaking, passing the sheath through the skirt without substantial air leakage. Air leakage from beneath the region of the skirt must be minimized since any substantial air leakage would reduce the pressure beneath the vehicle and could result in an inability to keep the heavy body 11 elevated. A slot or channel 26 in the body of the vehicle 11 is provided from the moon pool (not shown) in the building 12 out to edge of the vehicle. The slot 26 is covered by a flexible cover 27 of the same general nature as the skirt 16. The moon pool will also need a cover (not shown), preferably flexible, similar to the cover 27 to prevent air leakage when the region beneath the vehicle is filled with pressurized air. If desired a common cover can be used for both the moon pool and slot. One end of the flexible cover 27 is connected to the side of the building 12 so as to be substantially sealed thereto and prevent air leakage. The sides of the cover 27 are connected along the edges of the slot to prevent air leakage. A moon pool cover, if separate, is also sealed to prevent leakage. At its opposite end the cover 27 is connected to the plenum portion of the skirt in a tailored seam or joint 28 that matches the curvature of the two flexible portions. The air pressure beneath the body 11 causes the flexible cover 27 to billow upwardly in the same manner as the skirt billows when the vehicle is ready for transporting. FIGS. 3 and 4 illustrate the wellhead in the slot 26 between the moon pool and the skirt as during removal of the vehicle from the site of a well.

A vertically extending slot is provided in the skirt in a portion aligned with the channel 26 leading to the moon pool. The slot is in the form of a pair of vertically extending flexible sheets 31 extending from the bottom of the skirt to the top thereof. The sheets 31 are in fluid communication on one side with *the* interior of the skirt so that air pressure is applied thereagainst. The two sheets 31 are in face-to-face abutment on opposite sides of the slot. At their upper portion, above the line indicated at 32 in FIG. 3, the two sheets 31 are interconnected so as to be held together. If desired the sheets 31 can be interconnected along the line 32 and [lept] *kept* free both above and below. In fact, if desired the sheets 31 can be terminated at some point above the line 32 where they are interconnected to provide fluid communication between the plenum on one side of the slot and the plenum on the other side thereof. As is seen in the cross section of FIG. 4, rather than merely being flat the sheets 31 are connected to the balance of the skirt in a curved path to provide a smooth and rounded transition 33 at both the inner and outer sides of the skirt.

During operation air pressure within the skirt maintains the two abutting sheets 31 in engagement so that no substantial amount of air leaks through the slot from the area within the skirt. During most of the travel of the air cushion vehicle the slot 29 remains closed and the vehicle is handled in a conventional manner.

When it is desired to move the vehicle, onto or off of a wellhead, a streamlined sheath 24 is placed over the "Christmas tree" atop the well. The vehicle is moved so that the slot and the channel 26 in the body are substantially aligned with the long direction of the streamlined sheath. As the vehicle moves into a position where the skirt is in engagement with the sheath 24 the rounded portions 33 forming a flaring mouth for the slot 29 fit around the sheath. The abutting sheets 31, which are free to move relative to each other over the principal portion of their vertical extent, separate as the sheath enters the slot and they slide along the sheath as the skirt passes thereover. Air pressure within the skirt keeps the two facing sheets 31 in close engagement with the sheath 24 so that the region within the skirt remains sealed and there is no substantial air leakage from beneath the body of the vehicle. The rounded entrance to the slot is preferably made symmetrical inside and outside of the skirt so that the air cushion vehicle can be moved on to or off of a wellhead with equal facility.

The sheets 31 in opposite sides of the slot are preferably interconnected adjacent their upper portion for minimizing the stresses on the peripherally extending portions of the skirt. Preferably the interconnected portion should be an appreciable distance above the top of the sheath 24 so that air pressure within the skirt acting on the sheets 31 counteracts any stresses imposed by separation of the sheets and there is no significant force tending to tear the skirt. It will be noted that the sheets 31 rub against the side of the sheath 24 as the vehicle is moved off of the wellhead. This is not a significant problem since the amount of wear induced is quite small due to the relatively low pressures involved and the short time of travel as compared with the total life of the skirt. The same would not be true of a skirt sliding directly over a Christmas tree because of the substantial projections on a conventional Christmas tree which would tend to snag and tear the sheets. It is therefore preferred to employ a streamlined covering sheath over the Christmas tree or other wellhead structures.

Although limited embodiments of air cushion vehicle constructed according to principles of this invention have been described and illustrated herein, many modifications and variations will be apparent to one skilled in the art. Thus, for example, although the preferred arrangement is for a vehicle for transporting an assembled well drilling rig in an Arctic environment, many other structures can be employed in different situations to great advantage. The flexible cover between the skirt and building can be extended directly over the moon pool if desired when the surrounding region is open rather than in a shelter.

Many other modifications and variations will be apparent to one skilled in the art and it is therefore to be understood that within the scope of the appended claims the invention may be practiced otherwise than as specifically described.

What is claimed is:

1. An air cushion vehicle comprising:

a vehicle body;

a flexible skirt around the periphery of the body means for pressurizing the region within the skirt;

a clearance channel in the body; and a vertically extending slot through the skirt adjacent the channel, said slot comprising:

a first vertically extending flexible sheet on one side of the slot with one face in fluid communication with the interior of the skirt and having edges attached to the skirt; and a second vertically extending flexible sheet on the other side of the slot with one face in fluid communication with the interior of the skirt and having edges attached to the skirt, said first and second sheets being in face-to-face abutment for sealing together and free to move laterally relative to each other over a principal portion of their vertical extent for passing an object therebetween.

2. An air cushion vehicle as defined in claim 1 wherein the first and second sheets are connected to the skirt in the form of rounded edges for the slot at both the interior and exterior of the skirt.

3. An air cushion vehicle as defined in claim 1 wherein the first and second sheets are interconnected at their upper portion for preventing separation through at least a portion of their vertical extent.

4. An air cushion vehicle as defined in claim 1 in combination with a vertically extending streamlined sheath having a shorter vertical extent than the portion of the vertical extent of the first and second sheets free to move relative to each other.

5. An air cushion vehicle as defined in claim 1 further comprising a flexible cover over the channel and having an edge connected to the flexible skirt adjacent the slot.

6. An air cushion vehicle as defined in claim 5 wherein the first and second sheets are connected to the skirt in the form of rounded edges for the slot at both the interior and exterior of the skirt; and wherein the first and second sheets are interconnected at their upper portion for preventing separation through at least a portion of their vertical extent.

7. In an air cushion vehicle including a rigid vehicle body, a flexible skirt around the periphery of the body and means for pressurizing the region within the skirt, the improvement comprising:

means for passing a vertically extending object through the skirt; said means comprising a vertically extending slot through the skirt, and means for sealing the sides of the slot for preventing substantial air leakage from the region within the skirt comprising:

a first vertically extending flexible sheet on one side of the slot with one face in fluid communication with the interior of the skirt and having edges attached to the skirt *at the interior and exterior thereof*;

a second vertically extending flexible sheet on the other side of the slot with one face in fluid communication with the interior of the skirt and having edges attached to the skirt *at the interior and exterior thereof*, said first and second sheets being in face-to-face abutment *over most of their horizontal extent* for sealing together and free to move laterally relative to each other over a principal portion of their vertical extent; and a curved transition between the vertically extending sheets and skirt for forming a flared opening for the slot at both the interior and exterior of the skirt.

8. An improved peripherally extending flexible skirt for an air cushion vehicle comprising:

a first vertically extending flexible sheet with one face in fluid communication with the interior of the skirt and having edges attached to the skirt *at the interior and exterior thereof*; and a second vertically extending flexible sheet with one face in fluid communication with the interior of the skirt and having edges attached to the skirt *at the interior and exterior thereof*, said first and second sheets being in face-to-face abutment *over most of their horizontal extent* for defining a vertically extending sealed slot through the skirt, said first and second sheets being free to move laterally relative to each other over a principal portion of their vertical extent for passing an object therebetween; and wherein the first and second sheets are connected to the skirt in rounded portions for forming flared openings for the slot at both the interior and exterior of the skirt.

9. An improved *peripherally extending flexible* skirt [as defined in claim 8] *for an air cushion vehicle comprising*:

*a first vertically extending flexible sheet with one face in fluid communication with the interior of the skirt and having edges attached to the skirt at the interior and exterior thereof; and*

*a second vertically extending flexible sheet with one face in fluid communication with the interior of the skirt and having edges attached to the skirt at the interior and exterior thereof, said first and second sheets being in face-to-face abutment over most of their area for defining a vertically extending sealed slot through the skirt, said first and second sheets being free to move laterally relative to each other over a principal portion of their vertical extent for passing an object therebetween; and* wherein the first and second sheets are *connected to the skirt in rounded portions for forming flared openings for the slot at both the interior and exterior of the skirt, and are* interconnected at their upper portion for preventing separation through at least a portion of their vertical extent.

10. A drilling vehicle comprising:

a vehicle body;

a moon pool in the vehicle body;

a drilling tower mounted over the moon pool;

a flexible skirt around the periphery of the body;

means for pressurizing the region within the skirt;

a clearance channel in the body between the moon pool and a portion of the skirt; and means for passing a vertically extending object through the skirt and preventing substantial air leakage from within the region within the skirt.

11. An improved drilling vehicle as defined in claim 10 wherein the means for clearing a vertical object comprises a vertically extending slot through the skirt adjacent the clearance channel, said slot comprising;

a first vertically extending flexible sheet on one side of the slot with one face in fluid communication with the interior of the skirt and having edges attached to the skirt; and a second vertically extending flexible sheet on the other side of the slot with one face in fluid communication with the interior of the skirt and having edges attached to the skirt, said first and second sheets being in face-to-face abutment for sealing together and free to move laterally relative to each other over a principal portion of their vertical extent for passing an object therebetween.

12. An improved drilling vehicle as defined in claim [14] *11* in temporary combination with:

a vertically extending wellhead; and a vertically extending streamlined sheath over the wellhead, said sheath having a shorter vertical extent than the portion of the vertical extent of the first and second sheets free to move relative to each other.

13. An improved drilling vehicle as defined in claim 12 wherein the first and second sheets are connected to the skirt in rounded portions for forming a flared opening for the slot at both the interior and exterior of the skirt, said flared openings cooperating with the streamlined sheath for passing the sheath through the slot in the skirt.

14. An air cushion vehicle comprising:

a vehicle body;

a flexible skirt around the periphery of the body;

means for pressurizing the region within the skirt;

a clearance channel in the body for clearing a vertically extending object; and means for passing the vertically extending object through the skirt; said means for passing comprising a vertically extending slot through the skirt adjacent the channel, and means for sealing the sides of the slot for preventing substantial air leakage from the region within the skirt.

15. An improved air cushion vehicle as defined in claim 14 wherein the means for sealing comprises:

a first vertically extending flexible sheet on one side of the slot with one face in fluid communication with the interior of the skirt and having edges attached to the skirt; and a second vertically extending flexible sheet on the other side of the slot with one face in fluid communication with the interior of the skirt and having edges attached to the skirt, said first and second sheets being in face-to-face abutment for sealing together and free to move laterally relative to each other over a principal portion of their vertical extent.

References Cited

The following references, cited by the Examiner, are of record in the patented file of this patent or the original patent.

UNITED STATES PATENTS

| | | | |
|---|---|---|---|
| 3,252,536 | 5/1966 | Jones | 180—128 |
| 3,254,731 | 6/1966 | Schreiber | 180—127 |
| 3,291,238 | 12/1966 | Eggington | 180—128 |
| 3,333,650 | 8/1967 | Hardy | 180—128 X |
| 3,357,515 | 12/1967 | Richards | 180—128 |
| 3,395,772 | 8/1968 | Francis et al. | 180—121 |

FOREIGN PATENTS

| | | | |
|---|---|---|---|
| 1,043,351 | 9/1966 | Great Britain. | |
| 1,017,596 | 1/1966 | Great Britain. | |
| 1,052,745 | 12/1966 | Great Britain | 180—128 |

FRANK L. ABBOTT, Primary Examiner

R. E. FAVREAU, Assistant Examiner

U.S. Cl. X.R.

166—.5; 180—127